United States Patent
Wiemers et al.

(10) Patent No.: US 8,741,153 B2
(45) Date of Patent: Jun. 3, 2014

(54) NON-SACRIFICIAL ELECTRODES AND/OR COILS FOR IMMERSED WASTEWATER TREATMENT APPARATUS AND METHODS

(75) Inventors: Reginald A. Wiemers, Littleton, CO (US); Robert Kohlheb, Göttingen (DE)

(73) Assignee: Rockwater Resource, LLC, Denver, CO (US)

( * ) Notice: Subject to any disclaimer, the term of this patent is extended or adjusted under 35 U.S.C. 154(b) by 883 days.

(21) Appl. No.: 12/452,780

(22) PCT Filed: Jul. 31, 2008

(86) PCT No.: PCT/US2008/009258
§ 371 (c)(1),
(2), (4) Date: Jan. 22, 2010

(87) PCT Pub. No.: WO2009/017791
PCT Pub. Date: Feb. 5, 2009

(65) Prior Publication Data
US 2010/0116687 A1    May 13, 2010

Related U.S. Application Data

(63) Continuation of application No. 11/888,512, filed on Aug. 1, 2007, now abandoned.

(51) Int. Cl.
| | | |
|---|---|---|
| *C02F 1/463* | (2006.01) | |
| *C02F 1/469* | (2006.01) | |
| *C02F 1/66* | (2006.01) | |
| *B01D 17/06* | (2006.01) | |
| *C25B 11/12* | (2006.01) | |

(52) U.S. Cl.
USPC .......... 210/702; 204/554; 204/571; 210/724; 210/738; 210/748.01; 210/749

(58) Field of Classification Search
CPC ............ C02F 1/463; C02F 1/469; C02F 1/66; B01D 17/06; C25B 11/12
USPC ......... 210/188, 243, 258, 259, 261, 262, 299, 210/406, 702, 703, 748.01, 748.16, 210/512.1–540, 724, 738, 749; 96/151, 96/182, 183, 193, 194, 202, 204, 206, 96/217; 204/155, 157.15, 225, 204/228.1–230.8, 269, 270, 272, 450, 554, 204/600, 662, 666, 671, 571; 205/687, 742, 205/743, 751, 755
See application file for complete search history.

(56) References Cited

U.S. PATENT DOCUMENTS 1,118,614 A  *  11/1914  Allen .............................. 210/113
3,057,786 A  *  10/1962  Waddill .......................... 203/20
(Continued)

FOREIGN PATENT DOCUMENTS

| RU | 2060956 | * 10/1992 |
|---|---|---|
| RU | 2094384 | * 10/1997 |

OTHER PUBLICATIONS

Derwent Abstract for Patent Document RU 2,060,956, Published Oct. 1992.*

(Continued)

*Primary Examiner* — Joseph Drodge
(74) *Attorney, Agent, or Firm* — Harold A. Burdick

(57) ABSTRACT

Use of a non-sacrificial electrode made of synthetic graphite for applications utilizing conductive immersed treatment of wastewater is disclosed. The synthetic graphite is manufactured from a petroleum based extruded or molded composite material in any of plate, bar or coil forms. The electrodes are especially useful in the primary reaction chamber of an electrocoagulation apparatus.

19 Claims, 4 Drawing Sheets

(56) References Cited

U.S. PATENT DOCUMENTS

| | | | |
|---|---|---|---|
| 3,141,000 A * | 7/1964 | Turner | 137/599.01 |
| 3,524,213 A * | 8/1970 | Spivack | 15/354 |
| 3,535,236 A * | 10/1970 | Travis | 210/136 |
| 3,769,207 A * | 10/1973 | Baer | 210/703 |
| 4,338,178 A * | 7/1982 | Efimov et al. | 204/232 |
| 4,349,430 A * | 9/1982 | Efimov et al. | 204/237 |
| 4,349,431 A * | 9/1982 | Axenko et al. | 204/278 |
| 4,414,091 A * | 11/1983 | Axenko et al. | 204/277 |
| 4,710,292 A * | 12/1987 | DeVos | 210/218 |
| 4,728,404 A * | 3/1988 | Renzler | 205/744 |
| 4,872,959 A * | 10/1989 | Herbst et al. | 205/566 |
| 5,611,907 A * | 3/1997 | Herbst et al. | 205/742 |
| 5,741,426 A * | 4/1998 | McCabe et al. | 210/707 |
| 5,928,493 A * | 7/1999 | Morkovsky et al. | 205/757 |
| 6,613,217 B1 * | 9/2003 | Gilmore | 205/755 |
| 6,719,894 B2 * | 4/2004 | Gavrel et al. | 205/744 |
| 7,211,185 B2 * | 5/2007 | Powell | 204/673 |
| 7,258,800 B1 * | 8/2007 | Herbst | 210/703 |
| 2002/0020631 A1 * | 2/2002 | Gavrel et al. | 205/752 |
| 2003/0173300 A1 * | 9/2003 | Bradley | 210/665 |
| 2004/0238365 A1 * | 12/2004 | Tipton et al. | 204/660 |
| 2005/0274606 A1 * | 12/2005 | Powell | 204/228.2 |
| 2007/0199868 A1 * | 8/2007 | Volpe | 210/143 |
| 2011/0233144 A1 * | 9/2011 | McCabe | 210/748.16 |

OTHER PUBLICATIONS

Derwent Abstract for Patent Document RU 2,094,384, Published Oct. 1997.*

* cited by examiner ed and oil production sites, for example) all
NON-SACRIFICIAL ELECTRODES AND/OR COILS FOR IMMERSED WASTEWATER TREATMENT APPARATUS AND METHODS

RELATED APPLICATION

This application is a continuation of U.S. patent application Ser. No. 11/888,512 filed Aug. 1, 2007 now abandoned by inventors including the inventors herein which application is pending on the filing date of this Application.

FIELD OF THE INVENTION

This invention relates to electrodes, and, more particularly, relates to electrodes and coils for immersed wastewater treatment processes.

BACKGROUND OF THE INVENTION

Most industrial and municipal processes require water treatment facilities to treat effluents returned to the environment. Not all effluent treatment requires the same technologies however. Industrial effluents (such as is found at coal bed methane facilities or oil production sites, for example) all have different particulate, pollutant and/or biomass content inherent to both the industrial processes as well as the particular water and soil conditions found at the site. Municipal requirements would likewise vary depending on desired end-of-pipe quality and use (and again depending on the feed water present at the site).

Electrocoagulation treatment of effluents has long been known and utilized. The electrodes used are sacrificial and require replacement and/or cleaning periodically resulting in plant down time. These electrodes are relatively expensive thus adding to the capital burden of plant maintenance. Improvement directed to these electrodes for such processes could thus be utilized. Moreover, improved treatment technologies adapted to this and other uses can always be utilized given the criticality of provision and maintenance of clean water.

SUMMARY OF THE INVENTION

This invention provides non-sacrificial electrodes and/or coils and methods for immersed wastewater treatment apparatus and processes. The electrodes used are non-sacrificial and thus require less frequent replacement and/or cleaning. Plant down time and overhead expense is thus reduced.

For applications utilizing conductive immersed treatment of wastewater, the non-sacrificial electrode is made of synthetic graphite. An electrocoagulation wastewater processing apparatus of this invention includes a primary reaction chamber and a plurality of the non-sacrificial mounted in the reaction chamber.

The method for processing wastewater using an electrocoagulation process of this invention includes the steps of fitting a primary electrocoagulation reaction chamber with electrically conductive non-sacrificial electrodes, receiving feed water to be treated in the chamber, and utilizing positively charged ions natively resident in the feed water to maintain the electrocoagulation process. Ion content may be supplement using metal salts.

It is therefore an object of this invention to provide non-sacrificial electrodes and coils for electrocoagulation processes.

It is another object of this invention to provide non-sacrificial electrodes and/or coils and methods for immersed wastewater treatment apparatus and processes.

It is another object of this invention to provide apparatus and methods utilizing non-sacrificial electrodes in effluent treatment processes.

It is still another object of this invention to provide electrodes and/or coils for immersed wastewater treatment apparatus and processes that require less frequent replacement and/or cleaning.

It is yet another object of this invention to provide, for applications utilizing conductive immersed treatment of wastewater, a non-sacrificial electrode made of synthetic graphite.

It is another object of this invention to provide an electrocoagulation wastewater processing apparatus that includes a primary reaction chamber and a plurality of non-sacrificial electrodes made of electrically conductive synthetic graphite mounted in the chamber.

It is yet another object of this invention to provide a method for processing wastewater using an electrocoagulation process that includes the steps of fitting a primary electrocoagulation reaction chamber with electrically conductive non-sacrificial electrodes, receiving feed water to be treated in said chamber, and utilizing positively charged ions natively resident in the feed water to maintain the electrocoagulation process.

With these and other objects in view, which will become apparent to one skilled in the art as the description proceeds, this invention resides in the novel construction, combination, and arrangement of parts and methods substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
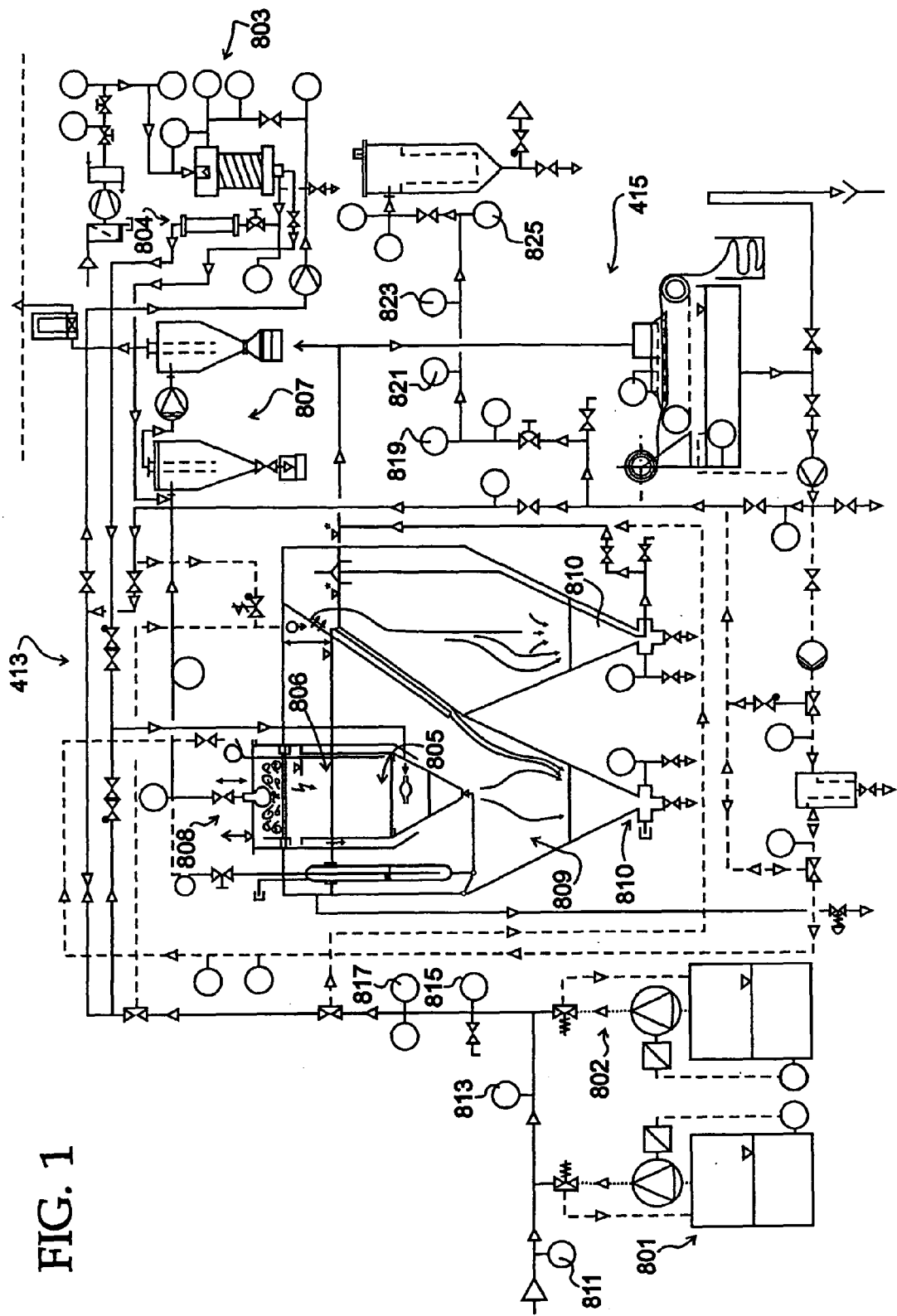
FIG. 1 is a diagram illustrating facilities for application of effluent treatment/sampling/testing processes.

Addressing preliminary matters, the pH of water is a means of expressing its acidity or basicity. The measurement of pH is a method of expressing hydrogen ion concentration logarithmically with the pH value being the negative logarithm (base 10) of the hydrogen ion concentration. Measurement of pH is important to water analysis, as the pH will dramatically affect the solubility of a number of slight soluble salts present in the various feed waters. pH is important in defining the alkalinity equilibrium levels of carbon dioxide, bicarbonate, carbonate and hydroxide ions. The concentrate pH is typically higher than the feed due to the higher concentration of bicarbonate/carbonate ions relative to the concentration of carbon dioxide.

Furthermore, the pH of a cleaning solution is an indicator of one of the most important mechanisms available for cleaning most membrane foulants and scale. Acidic solutions are effective at removing scale. The removal of foulants that originated from suspended solids or biological activity is performed with alkaline solution. Its high concentration of negatively charged hydroxide ions can break up and solubilize organic fats and oil that may be present. It can also disperse remaining solids since many of these tend to also have negative charge characteristics. Lowering the feed pH with acid results in a lower LSI. (Langlier Saturation Index) value, which reduces the scaling potential for calcium carbonate. Feed and concentrate (reject) pH can also affect the solubility and fouling potential of silica, aluminum, organics and oil. Variations in feed pH can also affect the rejection of ions. For example, fluoride, boron and silica rejection are lower when the pH becomes more acidic.

A typical pH measurement system always consists of four parts: a pH sensing electrode; an amplifier that translates the signal (4 to 20 mA) into something the controller unit can read; a reference electrode; and on-line implementation. Each part of the system plays a critical role in the on-line measurement process. Any reputable brand of on-line pH indication, registration and controlling system could be utilized herein, for example the systems provided by SIGNET Analytical Instruments.

Conductivity measurement may be utilized to determine the ability of water to transmit electricity due to the presence of dissolved ions. Conductivity measurement is a method for determining the level of ions in water, but does not identify the ion. Because the electrical current is transported by the ions in solution, the conductivity increases as the concentration of ions increases, thus conductivity increases as water dissolves ionic species. The basic unit of conductivity is the siemens (S). Since cell geometry affects conductivity values, standardized measurements are expressed in specific conductivity units (S/cm) to compensate for variations in electrode dimensions.

Conductivity measurements are used to obtain the data necessary to determine TDS (Total Dissolved Solids) values. Furthermore, the in-line conductivity measurements are utilized in the operational software with a conversion factor to convert water conductivity into total dissolved salts. This data can then be used in software to calculate a present salt rejection based on conductivity. There is generally a direct relationship between conductivity and the concentration of ions in a solution. Any reputable conductivity indication, monitoring and registration system can be utilized (for example, CDCN-80 systems by OMEGA).

FIG. 1 shows effluent treatment apparatus (in this case a pre-treatment suite) 413. These include pH and chemical dosing apparatus 801 and 802, respectively, ODE/IDI membrane aeration apparatus 803, electrocoagulation apparatus 805, dissolved air/gas flotation 806, vacuum introduced cyclone separation apparatus 807, vacuum degassing 808, lamella plate clarification 809 and sludge concentration output 810. Additionally, eight testing nodes 811 through 825 are shown.

The primary function of pre-treatment suite 413 is the removal or significant reduction (exceeding 90%) of colloidal matter with total suspended solids, such as polysaccharides or other slimy matter, less than about 75 nm. In addition, removal or significant reduction (by 80 to 90%) of fats, grease, oils and emulsions, and heavy metals (such as barium, strontium and others) by 60 to 99% is achievable. Finally, removal of entrained and produced gas by vacuum down to residual levels is achieved.

Regarding both ionized air/gas generation apparatus 804 and membrane aeration apparatus 803, improved ion treatment and reactor technologies, applications and methods of use are described. This aspect of the invention relates to effluent treatment utilizing ionized air or gas and membrane aeration, and has its objects, among others, enhanced ionized gas transfer through known membrane aeration technology providing energy efficiency over conventional venturi technology. Using this technology, ionized gas transfer into feed water is further enhanced by means of a static-in-line mixing comprising, for example, a progressive single coil system or an electrically charged dual coil system made from conductive but non-sacrificial material such as synthetic graphite.

As will be seen, an integrated coil mixing system is conveniently located between a portion of the outer membrane side and the inner reactor wall of the liquid side. A gas ionization chamber is an integrated part of the membrane support body. A radioactive energy source for gas ionization may be utilized, and is directly connected to the ionization chamber thus minimizing occurrences of recombination of ion pairs prior to their diffusive transfer into the liquid phase. Transparency of the reactor's housing and coil support body allows for visual inspection of the microbubble column and is controllable through means of associated valving conveniently located on a reactor mounting panel. The reactor's ionized air input is monitored and controlled by means of an in-line oxygen sensor and controller unit. The feed quality is monitored and controlled by means of conductivity meters at the incoming feed and the outgoing treated water lines.

In order to affect a reasonable fallout rate of contaminants in the water after electro-coagulation, it is necessary to add a chemical polymer prior to the electro-coagulation cell. If no chemical is added, fallout rates are unacceptably long. For a full size plant, this adds a burdensome financial component with respect to chemical costs and plant footprint. Slow fallout rates translate into large tanks for increased retention times.

Ionized air is a well recognized and employed technology in the field of air purification. By creating a large number of negatively charged oxygen ions and positively charged nitrogen ion, the ions then released into the air where they attach themselves to floating particulate matter of opposing charge, heavier particles are created through charge neutralization thus allowing them to fall to the ground effectively reducing airborne contaminants. The following teaches similar approaches at apparatus 803 and 804 of pre-treatment suite 413 for agglomerating, or coagulating, waterborne contaminants which are otherwise too small or incorrectly charged for easy removal.

Most waterborne contaminants in particulate form are charged. The charge can be positive or negative, although most particles in certain post industrial effluents (such as coal bed methane water) develop a negative charge. When the particulate matter freely floats in water, they are continuously being repelled by each other, this repelling action making the particles difficult to agglomerate to form a more easily removable mass.

By introducing a stream of negatively and positively charged ions into the water, one can effectively neutralize the particles specific charges thus allowing them to be brought into intimate contact to form more easily precipitated matter. Once the interparticle repulsive forces have been neutralized, the fallout rate in and after processing by electro-coagulation apparatus 805 will be enhanced and chemical treatment needs will be eliminated or drastically reduced. This process might also speed up and enhance the iron and manganese precipitation process as well. Finally, these ions are also very disinfective to harmful biologic components present in some feed waters presented for treatment and its holding tanks.

Membrane aeration apparatus 803 of pre-treatment suite 413 promotes radial mixing through means of an electrically charged Dualplex-start-Coil-System (DSC) mixing system. The DSC consists of two independent, non-touching coils with an even pitch spacing twisted around the membrane. The coils are situated in the space between the outside diameter of a membrane and the inside diameter of a support body. These coils are made of non-sacrificial, but conductive material, for instance graphite or graphite coated support material.

The proper non-touching spacing between the two coils is provided and secured through a thinwalled duplex-start grooved support body, made of clear nonconductive PVC. The duplex-starts in the support body are offset to each other (i.e., turned by 180°). Pitch of each coil and groove of one inch, providing a pitch distance of half an inch between the two independent coils, suggest good performance for most applications. The coils are screwed into the support body concurrently and the support body is inserted as a cartridge into a reactor glass body tube. The outer support body diameter is sealed against the body tube (using O-rings, for example).

AC power is connected to the coil to provide for electrical connection away from the liquid phase. In essence this embodiment operates similar to an electrocoagulation system with non-sacrificial electrodes, the electrically charged mixing coils representing the electrodes and the pitch spacing representing the electrode C-C distance. The operating current of the system is preferably 4 amps with a frequency converter setting of between 1 and 10 hertz.

This unit can be employed with photo (UV) or other means of initiation of air ionization. For example, if radioactive initiated air ionization is employed, the positively charged $\alpha$-particles will deflect towards the negatively charged electrical field. The frequency controlled alternating deflection of the $\alpha$-particles takes place primarily within the upper portion of the ionization chamber. This alternating deflection provides additional collision potentials with the continual incoming large number of neutral air molecules, thus slowing the recombination of positive and negative ion pairs prior to exposure to the contaminated effluent.

The alternating current flow provides an enhanced distribution environment for the diffusively aerated ionized air/gas for balancing the surface charge of particles in the feed water solution thus removing or reducing the electrical repulsive charge on the particles. This hydrodynamic mixing energy, provided through the differential pressure of the flow altering coil system, generates a turbulent fluid motion environment for interparticle contacts, sometimes called orthokinetik flocculation. The interparticle contacts of charge neutralized materials (for example, colloids) now destabilizes out of the dispersion, followed by collision of destabilized particles to form aggregates. The aggregation of these particles into larger more easily settled aggregates is necessary for efficiency enhancement of following processes where separation by precipitation, sedimentation and flotation takes place.

Figure 2:
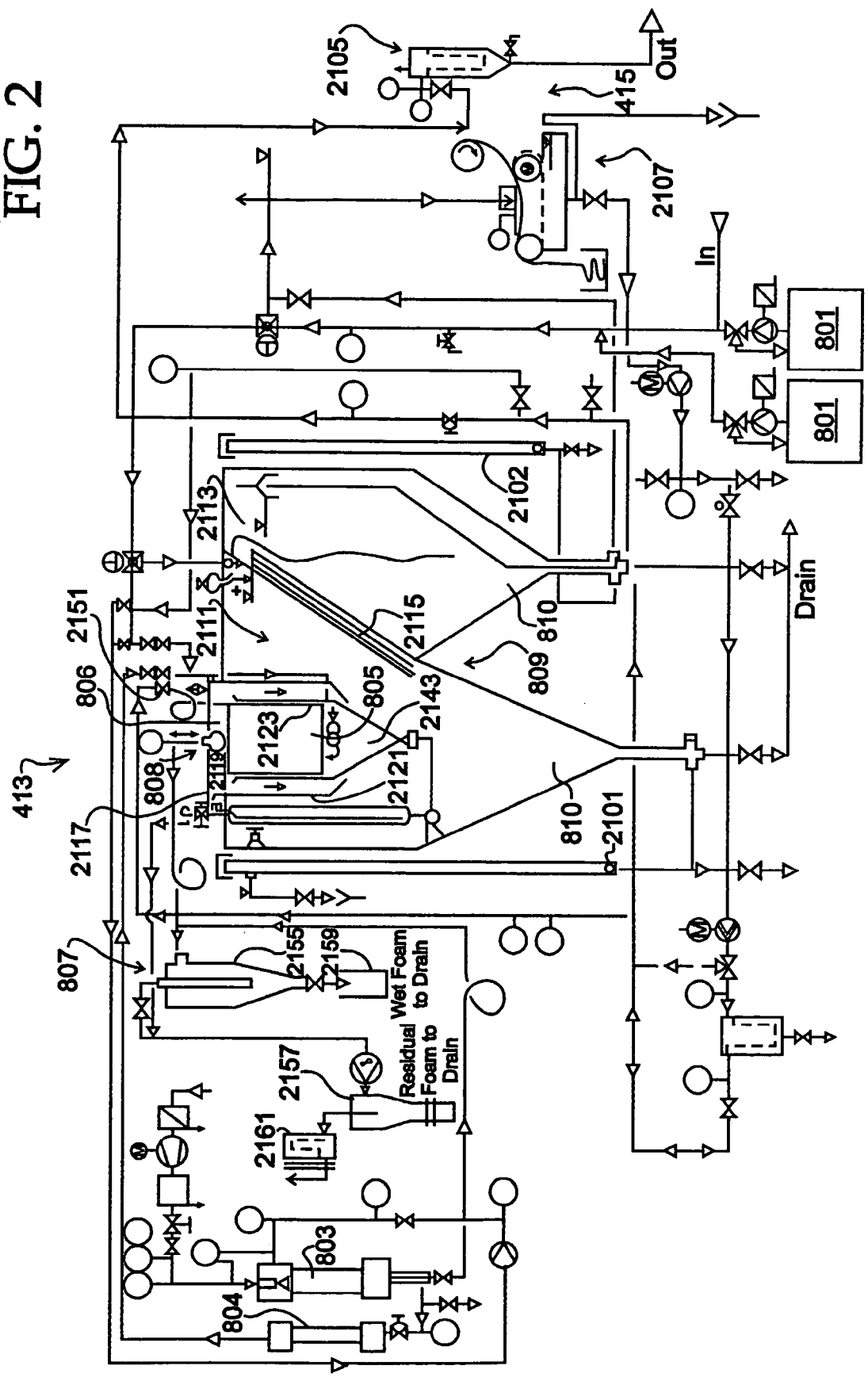
FIG. 2 is a diagram illustrating components utilized in a pre-treatment suite including electrocoagulation apparatus.
Figure 3:
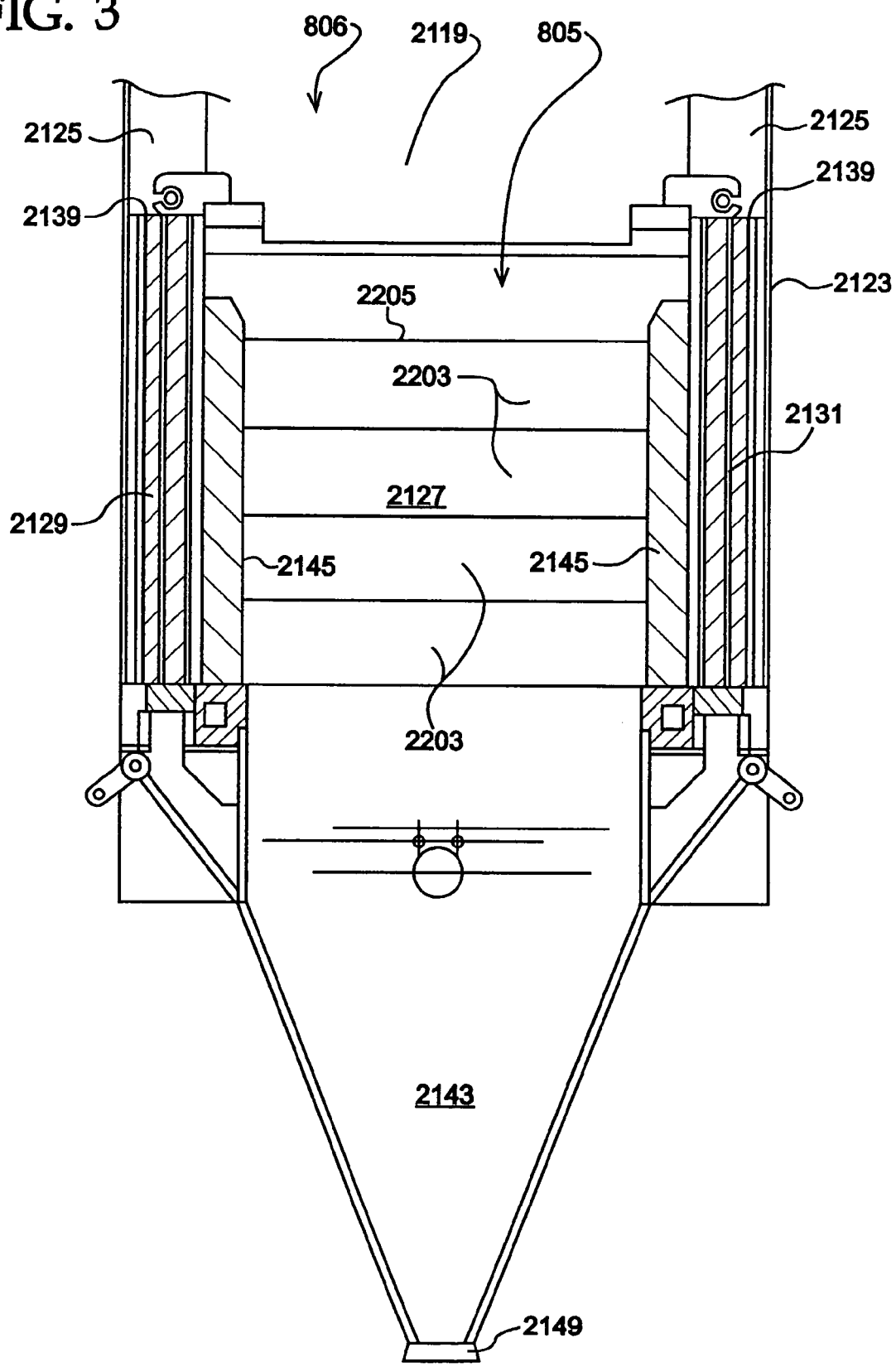
FIG. 3 is a sectional illustration of an electrocoagulation unit utilizable in the pre-treatment suite.
Figure 4:
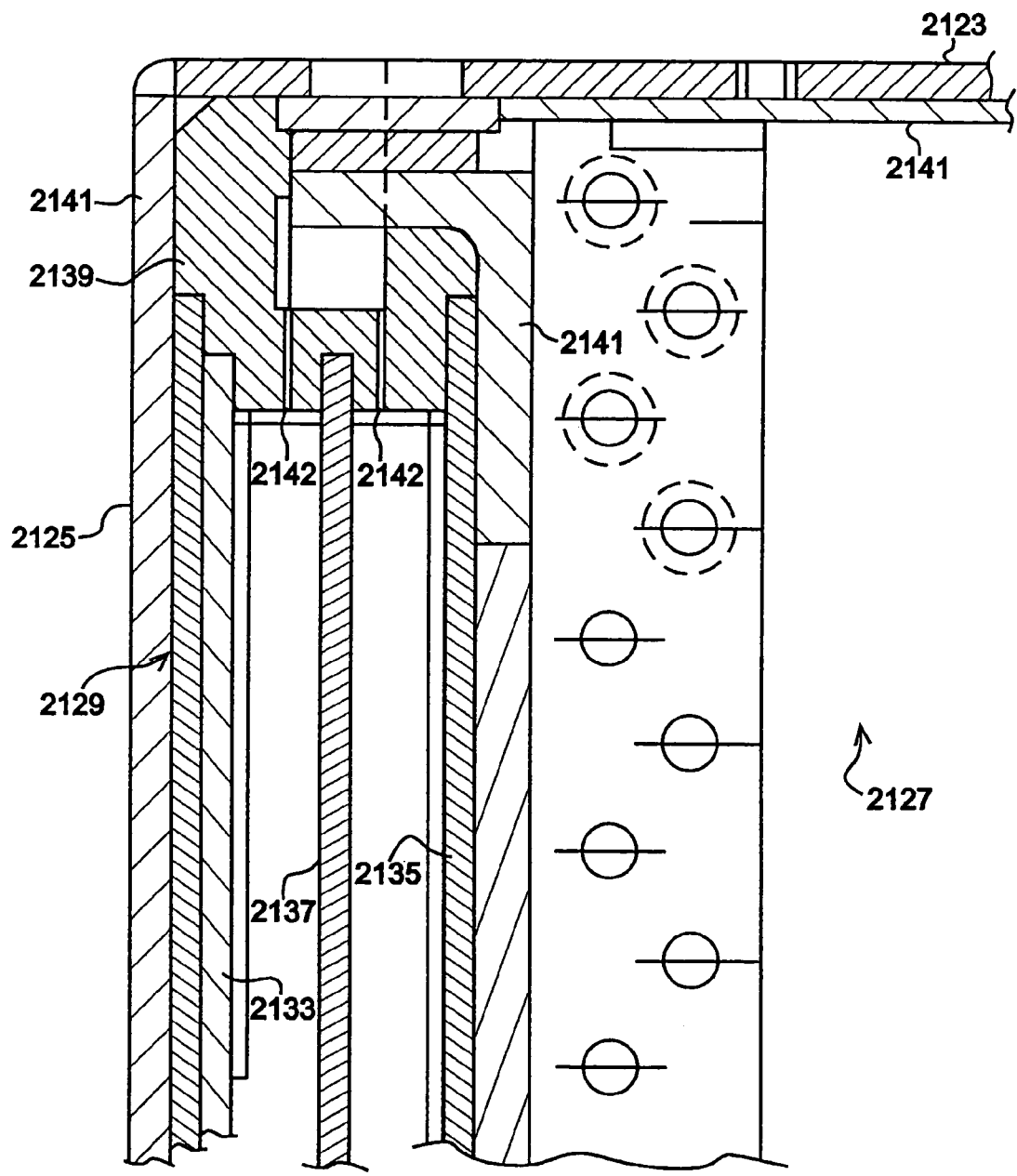
FIG. 4 is a partial sectional illustration of the housing of the unit of FIG. 3.

FIGS. 2 through 4 show various other apparatus of second pre-treatment suite 413, FIG. 2 illustrating a particular arrangement of suite 413 including the ten apparatus 801 through 810 heretofore identified configured with selected piping, flow control and instrumentation configuration. IDI inline ionizer unit 804 may be any known alpha ionizer such as the STATICMASTER series form NRD and related instrumentation. Level sight glasses 2101 and 2102 allow convenient on-site process inspection. Output from suite 413 proceeds to stage 415 including a bag filter system 2105 and belt filter system 2107.

In accordance with this invention, FIGS. 2 through 4 and the following description illustrate the electrocoagulation apparatus and configuration in pre-treatment suite 413. Electrocoagulation apparatus 805 operates conventionally but includes a number of unconventional features. In addition, apparatus 805 is positioned in tank 2111 (the larger of the two tanks 2111 and 2113 separated by separator plate 2115) of lamella plate clarifier apparatus 809. Electrocoagulation operates by the splitting off of ions from sacrificial electrodes, or utilization of non-sacrificial electrodes with native or added ions, in apparatus 805. The ions are thus introduced into the water presented for treatment to destabilize suspended, emulsified or dissolved contaminants in the water by introduction of an electrical current. The water acts as an electric conductor in which current is carried, thus forming a hydroxide compound. The most common sacrificial electrodes utilized in such apparatus are made of iron or aluminum, the most common non-sacrificial electrodes being made of carbon.

Present electrocoagulation art does not adequately address the mechanisms of flotation, sedimentation and the circulation effect of coagulant aggregation in the early stages as bridging flocs. In the electrocoagulation process, the partially lighter aggregated coagulants are transported to the liquid surface by their attachment onto the ascending electrolytic gas bubbles. The remaining, predominantly heavier, aggregated coagulants bridge to heavier, larger flocs and precipitate out into a sediment layer.

Treatment analysis in advance of establishment of the treatment regimen determines the necessary mass quantity of matter that needs to be deposited by the sacrificial electrodes. For diagnostic real time capability, the electrocoagulation reactor described hereinafter may be equipped with selective multiple electrolytic cell choices (14 cells, for example) in the primary reactor chamber.

In accordance with this aspect of the invention, the following relates to electrical apparatus for electrolytic flotation and electrochemical dosing referred to as electrocoagulation, and apparatus, configurations and methods for treating contaminated waters for selective pre-treatment and/or cleaning of the waters. Electrocoagulation presents a cost-effective alternative to traditional methods for treatment of certain polluted waters or as a method for the pre-treatment of suspensions, emulsions and light sludges prior treatment with membrane technology, for instance clean up involving gas, dissolved and suspended solids removal from a hydraulic system where chemical or electrochemical dosing, coagulation, electroflotation, flocculation and sedimentation would be employed.

Apparatus 805 of this invention allows for a variety of electrode materials to be implemented within one active electrode plate area for numerous electrolytic treatment applications. The apparatus is compact and portable for easy delivery and hookup and is used in conjunction with the other apparatus for blending air, plasma-gas and/or dissolved metal salts with the feed water. As shown in FIG. 2, a plurality of pumps for controlling the feed water flow and a plurality of conveniently located valves, regulators and pump controls for automated or manual control of the various functions of the apparatus 805 are provided. Apparatus 805 is integrated directly with dissolved air flotation apparatus 806 in clarifier apparatus 809, and is further enhanced by integration with vacuum apparatus to accelerate the electroflotation of the floc-foam layer to the liquid surface of electrocoagulation reactor (together referred to herein as "electrolytic dissolved air flotation"—EDAF—treatment).

The EDAF treatment approach utilizes a modified plate electrocoagulation reactor design. Because electrocoagulation reactor 805 is an integrated part of clarifier tank 2111 of lamella apparatus 809, shear-free sludge transfer in a compact single unit structure is provided. Vacuum enhanced electroflotation is provided through the employment of an enclosed vacuum hood 2117 above flotation chamber 2119 of flotation apparatus 806, to speed up the flotation process and as well remove unwanted created or entrained gases via vacuum degassing apparatus 808.

Vacuum hood 2117 is adjustable for proximity and vacuum lift capability to optimize the electroflotation effect as well as floc-foam surface layer removal at cyclone separator apparatus 807. Hood 2117 is mounted on outer housing 2121 holding inner reactor assembly 2123 of electrocoagulation apparatus 805. Inner assembly 2123 (FIG. 3) is defined by four corner posts 2125 (FIG. 4) together establishing primary reaction chamber 2127 and secondary reaction chambers 2129 and 2131 adjacent the primary chamber. The secondary chambers provide additional electrocoagulation treatment stages to optimize the overall electrocoagulation treatment on an as needed basis. Each secondary chamber includes an anode, cathode and bipolar electrode 2133, 2135 and 2137, respectively, held in corner post 2139 for insulating the secondary chambers as well as forming supports for insulating walls 2141 of the primary chamber. A small jet of previously clarified process water received through conduits 2142 washes electrode 2137

Conical sludge chamber 2143 is formed below primary reaction chamber 2127 and vacuum/flotation chamber 2119 of flotation apparatus 806 is formed below, chamber 2127. Primary electrode plates (either sacrificial or, preferably, non-sacrificial) are held at a plurality of electrode positioners 2145 at opposed chamber walls. This electrode framework allows rapid electrode interchangeability and/or electrode set ups specially adapted to site circumstances. For example, a composite electrode setup with electrodes of different materials combined within a single electrode stack could be utilized for treatment of complex feed waters. Bipolar electrodes 2137 of secondary chambers 2129 and 2131 are readily accessible for maintenance purposes.

Integrated sludge chamber 2143 provides buoyancy and/or electromechanically actuated sludge transfer via a sludge cone valve 2149. Sludge is transferred from sludge chamber 2143 into the fluid bed of the sludge holding/disposal chamber 810 at lamella clarifier tank 2111 of clarifier apparatus 809, thus minimizing a shear introducing gradient to the delicate floc structure within the sedimentated electrocoagulation sludge. This eliminates or greatly reduces the need for expensive floc polymers and/or coagulants as well as reducing energy requirements for the floc rebuilding process. A compound sludge chamber angle of repose of 35° for hydroxide sludge is employed thus, in conjunction with a matching sludge cone release valve, preventing sludge build up within the chamber and expediting sludge release.

A variable discharge head and distribution system may be employed to minimize surface floc-foam layer carry over from the primary chamber and provide suitable discharge distribution geometry into secondary electrocoagulation chamber(s), thus minimizing channeling and ensuring effective electrocoagulation treatment in the secondary electrocoagulation. Secondary electrocoagulation flow control may be provided through discharge disks and dampener adjustment to ascertain proper flow distribution, retention time and minimize channeling, providing an effective secondary and efficient overall electrocoagulation treatment.

Multiple flat bar electrodes 2203 forming multiple electrode stacks 2205 (only one shown in FIG. 3) are employed. These standard vertical stacks consist of electrode bars 2203 arranged one on top of another. Horizontal stacks 2205 may be arranged with electrode bars 2203 in a side by side arrangement (instead on atop one another) and secured by a top contactor clip which also provides current transfer from one stack 2205 to the next. The vertical multi-flat bar stack 2205 arrangement is more suitable to maximize sacrificial electrode life. The sacrifice of electrode material is more pronounced on the leading edge/area of the ascending feed water flow in a downward or upward directed parabolic shape. The leading edge problem can be minimized by substituting the bottom bar with a nonmetallic, but conductive graphite bar. If unacceptable, a new sacrificial bottom bar needs to be added from time to time between whole stack replacements.

The vertical multi-flat bar option provides a mechanism for active electrode area reduction without sacrificing reactor retention time by insertion of dielectric/nonconductive plate area (PVC or CPVC) into the vertical stack electrode structure in place of active electrode bar(s). This allows varying of the active surface area to volume ratio to find the optimum ratio for a particular application. This variable ratio option is an important feature in establishing scale-up of this parameter.

Required electrical field strength (dependent upon concentration levels and contaminant types in the feed water) can be manipulated by varying electrode C-C spacing for treatment optimization. Primary electrocoagulation facilities at 2127 are powered with a variably applied amperage in the range of 0.1 to 60 amps. With electrode bars set in series connection mode, the same current flows through all the electrodes and voltage is allowed to vary as electrocoagulation treatment progresses over time.

A crossflow electrode flushing capability option through valve 2151 is preferably provided to create a turbulent flow regime with the ascending water flow in primary electrocoagulation reactor chamber 2127 and with the descending flow within the secondary electrocoagulation reactor chambers 2129 and 2131. Flow direction of flush water jetting is staggered crosswise and perpendicular to the electrocoagulation process water flow over the electrode plates. The directed turbulent flow continually washes the sides of the electrodes and prevents or significantly retards the build-up of impermeable oxide layers (passive) on the cathode as well as deterioration of the anode due to oxidation. This can be done instead of polarity switching or, in a fine regulated mode, in addition to polarity switching in severe scaling situations or in applications that contain heavy amounts of grease or oils.

A small jet of previously clarified and pressurized process water flow is constantly or time sequentially introduced into the electrocoagulation process water flow through a plurality small (1/32", for example) holes drilled into electrode positioners 2145 at primary electrocoagulation reactor chamber 2127. Secondary electrocoagulation reactor chambers 2129 and 2131 have a plurality of similar holes 2142 drilled into spaces at insulating corner post 2139 between and close to the electrodes.

The three phase separation and removal areas of electrocoagulation reactor apparatus 805 operates as a standard parallel electrode unit (in a fluidized bed configuration a different arrangement would be applied). In phase one, light flotation solids in the floc-foam, gas ($H_2$ and $O_2$), and oil and grease layers are separated at the liquid surface and removed by the adjustable vacuum at vacuum chamber 2119. In phase two, the semi-clarified effluent of the primary electrocoagulation treated water is separated from underneath the floc-foam surface layer at chamber 2127 and is removed or transferred through adjustable disk head control devices into the secondary electrocoagulation reactor chambers 2129/2131. It is here either optionally treated or directly discharged into the settling portion of the lamella clarifier tank 2111 to develop clarity prior to discharge from the lamella separator 2115 overflow into the clear flow catch tank 2113. In phase 3, the solids precipitate out into integrated primary electrocoagulation sludge chamber 2143, proceeding through the normal sedimentation process mechanics.

When operating electrocoagulation apparatus 805 with non-sacrificial electrodes, for instance with electrically conductive synthetic graphite electrodes, the necessary positively charged ions for maintaining the electrocoagulation process are partially provided by (natively resident in) the feed water itself. The remaining part of the required positively charged ions are added in form of metallic ions such as $Al+$, $Ca+$, $Fe+$ and $Mg+$ salts. For an enhanced electron migration, the electrocoagulation process should be operated within the acidic range through chemical dosing with hydrochloric ($HCl$), sulfuric ($HS_2O_4$) or phosphoric acid ($H_3PO_4$). Utilization of synthetic graphite electrodes avoids the consumption, replacement and operating down-time associated with conventional sacrificial electrodes, and reduces energy and maintenance costs. Moreover, metallic salts are less expensive than the refined, finished, sawcut and otherwise machined or fabricated sacrificial metal electrode plates.

Synthetic (non-natural) graphite is a petroleum-based composite material (sometimes also referred to as artificial graphite) and is typically formed by any of extrusion, vibration molding, compression molding or isostatic molding processes. It can include up to four production stages: baking, graphitization, purification and impregnation. The particular synthetic graphite utilized for non-sacrificial electrodes 2203 is selected for excellent electrical conductivity, good thermal shock resistance, high mechanical strength, and low coefficients of thermal expansion and friction. A good product for this application is GR001CC from GRAPHITESTORE.COM.

To facilitate feed into chamber 2127, a longitudinal tube turns for net feed area adjustment inside of the stationary 1¼" base pipe, a defined net opening slot area distributing the whole feed through the whole length of primary electrocoagulation reactor chamber 2127. To facilitate discharge from inner reactor assembly 2123, discharge weir disk orifices are preferably provided for flow control from chamber 2127 or into secondary chambers 2129 and/or 2131. To prevent surface foam carry over into the secondary electrocoagulation treatment chambers, a positive head above the center of these orifices needs to be maintained at all times.

Through simple contact plunger manipulation at an easily accessible multinode terminal bar or bars adjacent the electrodes (either manual or automated contact manipulation could be deployed), electrocoagulation reactor operating circuitry can be arranged for different modes of operation. For parallel operation, contact plungers are provided at each electrode node at a terminal bar. This arrangement of the electrocoagulation reactor circuitry provides parallel connection using monopolar electrodes. In this mode, the electric current is divided between all of the electrodes in relation to the resistance of the individual cells. The same voltage is present in all of the contact plungers. Varying the current controls the rate of electrochemical activity For series operation, one contact plunger remains active at the terminal bar furthest from the source power connections. Insulated jumpers connect the nodes. In this mode of operation the contactor terminal bar provides series connection for the monopolar electrodes in the electrocoagulation reactor. In series cell arrangements, a higher potential difference is required for a given current to flow, because of higher cumulative resistance. The same current would, however, flow through all the electrodes. Varying the voltage controls the rate of electrochemical activity.

In a parallel, bipolar configuration (as shown in the secondary chambers 2129 and 2131, but which could be applied primarily), one contact plunger at both contactor terminal bars remains, the one furthest from the source power connections. Only the monopolar anode and cathode electrodes are connected to the electrical power connections. In this mode, bipolar electrodes with cells in parallel are used. The bipolar electrodes are placed between the two parallel anode/cathode electrodes without any electrical connections. When an electric current is passed through the two electrodes, the neutral sides of the conductive plate of the bipolar electrodes will be transformed to charged sides, which have opposite charge compared to the parallel side beside it. This cell arrangement provides, where applicable, a desirable testing platform for a full scale unit application. Its simple set-up and maintenance can lower the overall electrocoagulation operating cost.

A mixed parallel and series configuration could be provided, providing individual mixed cell circuitry configurations. For instance, in a fourteen cell reactor, half the cells could be connected in a series circuitry and the remaining seven cells connected in parallel, either as monopolar, bipolar or in mixed mode. This option can be used as a diagnostic tool when different amperages are needed for different electrode materials within the primary electrocoagulation reactor for specific treatment situations.

These parallel or series power connection choices are implemented by spring loaded contactor bars with integrated connection interchangeability (plungers). DC or AC operating power options with variable current density controls are implementable for control of electrochemical dosing and electrolytic bubble density production for sacrificial electrodes, as well as regulating the required transport current for the required added positively charged ions when nonmetallic and non-sacrificial electrodes are employed.

Controlled polarity switching for DC power implementations is provided to prevent or minimize oxide build up as well as hydrogen polarization. A vector frequency controller for the AC power option provides for frequency control below 60 Hertz to prevent disaggregation of agglomerated particles. To accommodate rapid changes of electrodes and/or customization of electrode setups, main power distribution through removable, quick release, swing away main contactor bars, providing as well for rapid change from parallel to series power connection, is utilized.

Regarding pre-treatment suite stages 411 and 413, zeta potential is an important part of the electrokinetic phenomena of interaction between particles in suspension. The zeta potential is the electrokinetic potential of a suspended particle as determined by its electrophoretic mobility. This electric potential causes colloidal particles to repel each other and stay in suspension. The zeta potential is a measurement of the overall charge characteristic of the suspended particles in the water. The kind and magnitude of the electrical charge depends on the surface potential of the particles, or the zeta potential. A negative zeta potential indicates that the water contains free negatively charged suspended solids (common in many treatment feed waters) that are stabilized and therefore more likely to stay in solution.

A neutral zeta potential indicates that the suspended solids do not carry a charge to assist in their electrical repulsion of each other. They are more likely to destabilize and coagulate into larger particulate groups and fall out of solution, and therefore being removed as part of the pre-treatment. The importance of the zeta potential rests on the fact that it can be measured experimentally and in many cases serves as a good approximation of the unmeasurable surface potential of the colloidal particle, since there is a fairly immobile layer of counter ions that sticks tightly to the surface of the particle. Treatment diagnostics herein thus uses the zeta potential measurement to gauge coagulant requirements (if any), and can be adapted for automated adjustment of an injected cationic (positively charged) coagulant such as reverse osmosis Quest 6000, which could be used in pre-treatment stage 411, to achieve a neutral zeta potential upstream of pre-treatment stage 413. Thus utilized, suspended solids would be more likely to fall out of solution into 2111 of clarifier 809.

Vacuum introduced cyclone separation apparatus 807 of suite 413 (FIG. 2) utilizes a conventional cyclone unit or units 2155 and 2157 connected for vacuum inducement apparatus 808 and hood 2119 and outlet for foam collection through filters 2159 and 2161, respectively. Filtration stage 415 (step 7) makes use conventional know bag filter systems 2105 and or belt filtration systems 2107 (such as the Roll-A-Filter or Lazy Filter fabric media systems produced by SERFILCO.

What is claimed is:

1. A method for processing wastewater using an electrocoagulation process comprising the steps of:
   fitting a primary electrocoagulation reaction chamber with electrically conductive non-sacrificial synthetic graphite electrodes manufactured from a petroleum based composite material;
   receiving feed water to be treated in said chamber; and
   utilizing maintaining an electrocoagulation process upon actuation of current through the electrodes by establishing positively charged metallic ions in the feed water.

2. The method of claim 1 wherein the step of establishing positively charged ions in the feed water includes positively charged ions natively resident in the feed water.

3. The method of claim 1 wherein the step of establishing positively charged ions in the feed water includes supplementing positively charged ions in the feed water by adding metallic salts to the feed water before movement thereof into the chamber.

4. The method of claim 1 further comprising the step of chemically dosing the feed water with hydrochloric, sulfuric or phosphoric acid to assure operations within the acidic range.

5. The method of claim 1 further comprising manufacturing said non-sacrificial electrodes from petroleum based synthetic graphite material.

6. The method of claim 1 wherein the step of fitting a primary electrocoagulation reaction chamber with electrically conductive non-sacrificial electrodes further comprises utilizing either plate or bar form said electrodes and arranging said electrodes to provide an electrocoagulation assembly.

7. The method of claim 1 wherein the step of fitting a primary electrocoagulation reaction chamber with electrically conductive non-sacrificial electrodes further comprises a non-sacrificial electrode made of extruded or molded composite material.

8. A method for processing wastewater comprising the steps of:
   establishing a wastewater stream having at least some resident positively charged metallic ions present therein at a processing area; and
   establishing an electrical current at said processing area by establishing current through immersed non-sacrificial synthetic graphite electrodes manufactured from a petroleum based composite material to promote at least one of wastewater stream mixing, particle aggregation and electrocoagulation processing.

9. The method of claim 8 further comprising arranging said electrodes in a series connected current flow configuration.

10. The method of claim 8 further comprising arranging said electrodes in monopolar parallel connected current flow configuration.

11. The method of claim 8 wherein the step of establishing an electrical current through immersed non-sacrificial electrodes includes application of either DC or AC operating power to said electrodes.

12. The method of claim 8 further comprising supplementing positively charged ions in the wastewater stream.

13. The method of claim 12 further comprising controlling current density to regulate transport current established at said processing area.

14. The method of claim 8 further comprising arranging said electrodes in bipolar parallel connected current flow configuration.

15. The method of claim 8 wherein the step of establishing and electrical current using non-sacrificial electrodes includes establishing electrodes in coil form for static-in-line mixing of effluents.

16. An electrocoagulation wastewater processing method comprising:
   establishing a processing area in a primary reaction chamber; and
   mounting a plurality of non-sacrificial electrically conductive synthetic graphite electrodes manufactured from a petroleum based composite material at said processing area of said reaction chamber, said electrodes having no sacrificial metallic component affixed thereto; and
   establishing current through said electrodes to maintain an electrocoagulation process at said reaction chamber in conjunction with positively charged metallic ions in a feed water stream.

17. The method of claim 16 further comprising positioning in communication with said processing area of said primary reaction chamber at least one secondary reaction chamber having an electrode therein.

18. The method of claim 16 further comprising arranging said electrodes in one of a monopolar parallel connected or series connected current flow configuration.

19. The method of claim 16 further comprising integrating a lamella plate clarifier into said reaction chamber.

\* \* \* \* \*